US008161148B2

(12) United States Patent
Tamura

(10) Patent No.: US 8,161,148 B2
(45) Date of Patent: Apr. 17, 2012

(54) COMMUNICATION DEVICE AND METHOD FOR SETTING THE COMMUNICATION SETTING REQUIRED TO ESTABLISH COMMUNICATION

(75) Inventor: Yoshiteru Tamura, Nagoya (JP)

(73) Assignee: Buffalo Inc., Nagoya-Shi (JP)

( * ) Notice: Subject to any disclaimer, the term of this patent is extended or adjusted under 35 U.S.C. 154(b) by 605 days.

(21) Appl. No.: 11/166,787

(22) Filed: Jun. 24, 2005

(65) Prior Publication Data

US 2006/0129677 A1    Jun. 15, 2006

(30) Foreign Application Priority Data

Jul. 1, 2004   (JP) ................................ 2004-195230

(51) Int. Cl.
    *G06F 15/173* (2006.01)
(52) U.S. Cl. ..................... 709/223; 709/225; 709/226
(58) Field of Classification Search .................. 709/227, 709/228, 220, 225, 222
    See application file for complete search history.

(56) References Cited

U.S. PATENT DOCUMENTS

| 6,073,172 | A  | * | 6/2000  | Frailong et al. | ............... 709/222 |
| 6,148,332 | A  | * | 11/2000 | Brewer et al.   | ................ 709/218 |
| 6,977,906 | B2 | * | 12/2005 | Owens et al.    | ................ 370/252 |
| 7,370,351 | B1 | * | 5/2008  | Ramachandran et al. | ........ 726/8 |
| 2001/0054101 | A1 | * | 12/2001 | Wilson        | ........................ 709/225 |
| 2003/0115354 | A1 | * | 6/2003  | Schmidt et al. | ............... 709/232 |
| 2003/0217289 | A1 | * | 11/2003 | Ammon et al.  | ............... 713/201 |
| 2004/0107261 | A1 | * | 6/2004  | Donzis et al.  | ................ 709/207 |
| 2004/0133689 | A1 | * | 7/2004  | Vasisht        | ........................ 709/228 |
| 2004/0229606 | A1 | * | 11/2004 | Oshima et al.  | ............ 455/426.2 |
| 2004/0258051 | A1 | * | 12/2004 | Lee            | ............................... 370/352 |
| 2006/0021019 | A1 | * | 1/2006  | Hinton et al.  | ................... 726/10 |

FOREIGN PATENT DOCUMENTS

| JP | 2003-283589  | 10/2003 |
| JP | 2004-40651   | 2/2004  |
| WO | 2004/045148  | 5/2004  |

OTHER PUBLICATIONS

Office Action from Japanese Application 2004-195230, dated Apr. 20, 2010.
Shimada, Hiromichi, "Broadband Router Walkthrough Guideline," Jun. 28, 2001.

* cited by examiner

*Primary Examiner* — Michael Won
*Assistant Examiner* — Tom Y Chang
(74) *Attorney, Agent, or Firm* — Beyer Law Group LLP

(57) ABSTRACT

Upon no completion of setting of a user ID and a password to be sent to a PPPoE server, in response to reception of a DNS request from a client, a communication device of the invention sends back a unique LAN IP address, which is allocated to the communication device, as a DNS reply to the client, regardless of the contents of the DNS request. The client then sends an HTTP request to the received LAN IP address, and the communication device sends back a Web page for entry of the user name and the password as an HTTP response to the client. The Web page for entry of the user ID and the password is displayed on an active Web browser of the client. This arrangement enables the user to readily complete setting for communication in the communication device.

10 Claims, 6 Drawing Sheets

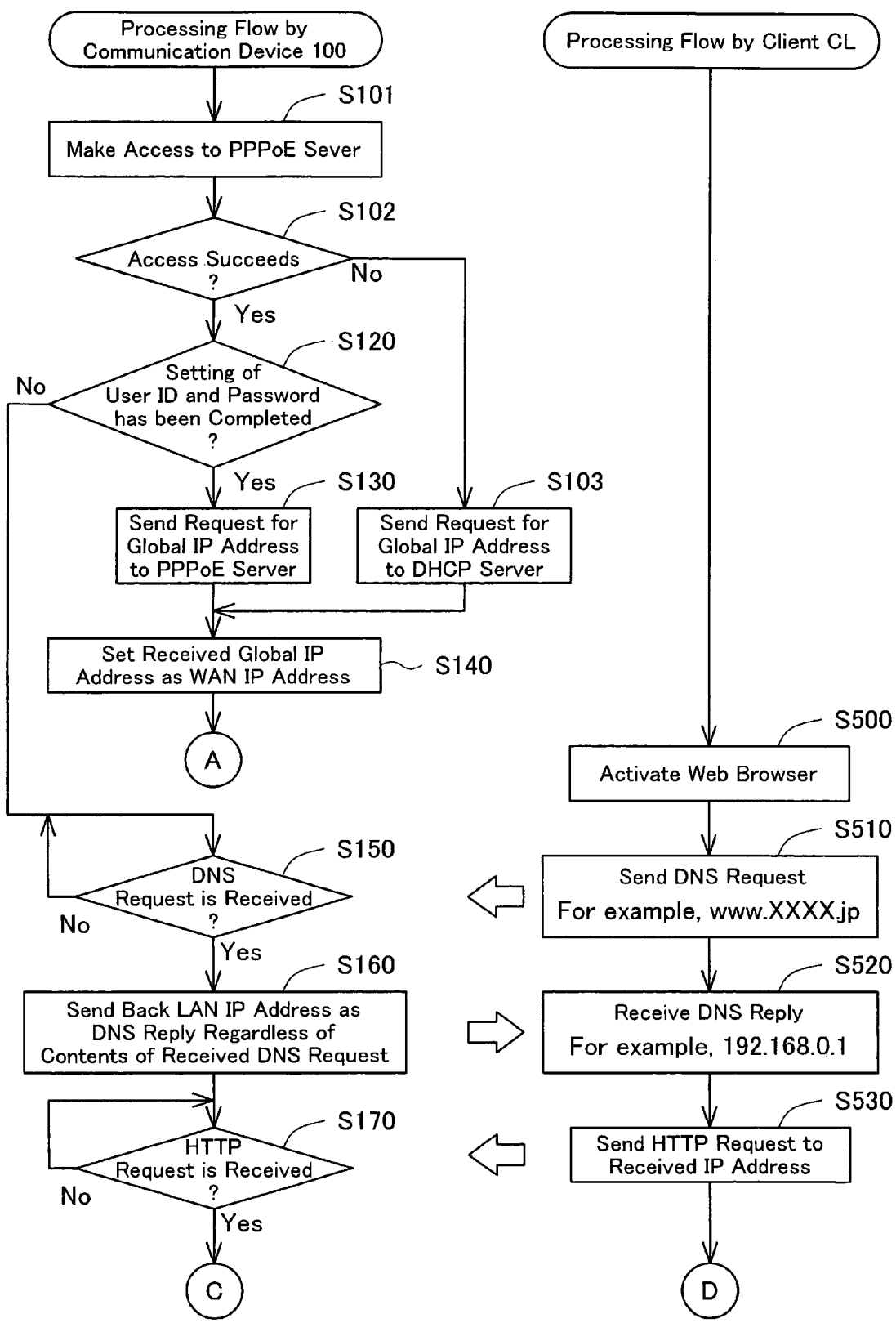

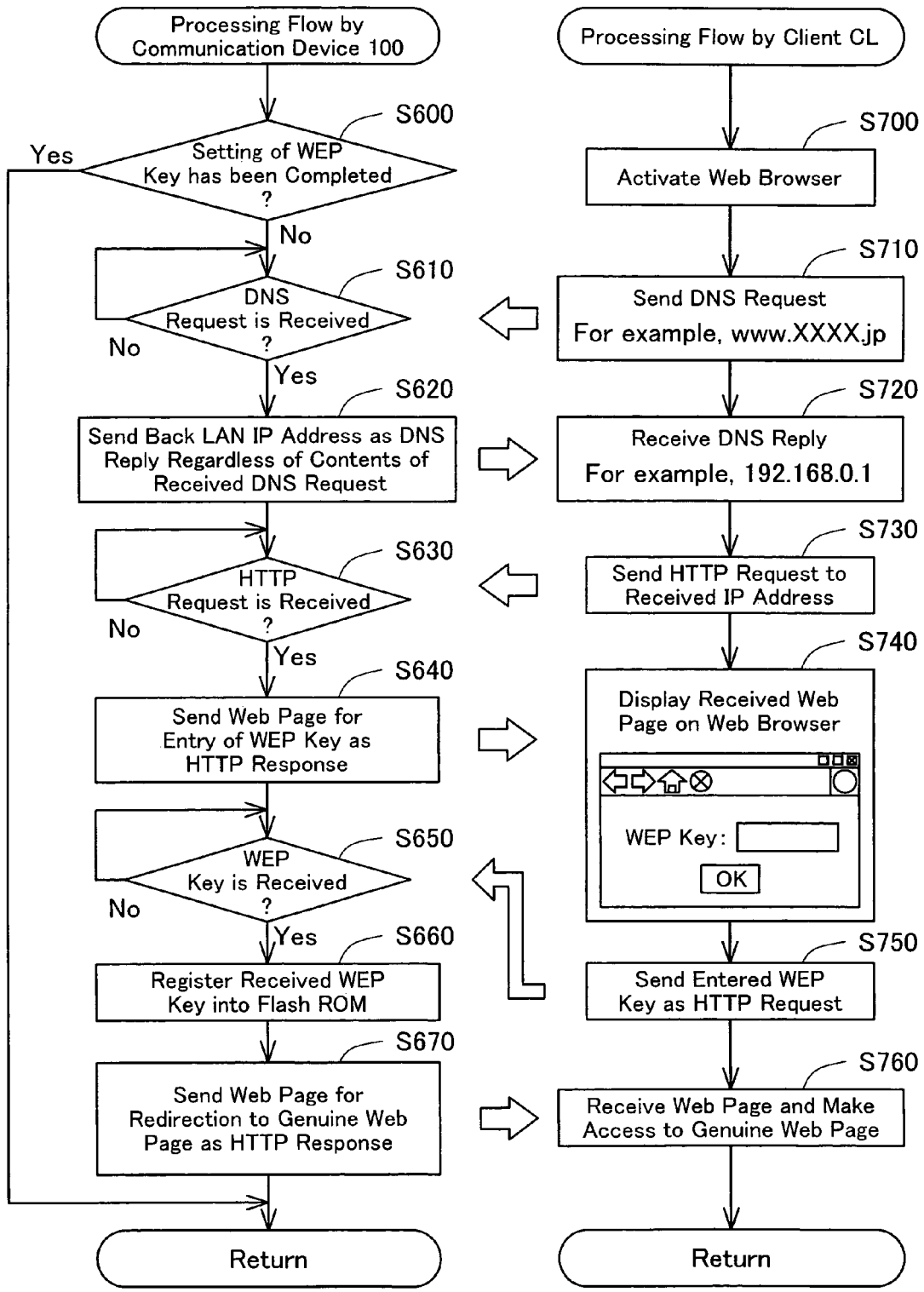

COMMUNICATION DEVICE AND METHOD FOR SETTING THE COMMUNICATION SETTING REQUIRED TO ESTABLISH COMMUNICATION

CLAIM OF PRIORITY

The present application claims the priority from Japanese Patent Application No. 2004-195230 filed on Jul. 1, 2004, the contents of which are hereby incorporated by reference herein.

BACKGROUND OF THE INVENTION

1. Filed of the Invention

The present invention relates to a communication device that establishes communication with a server computer via a network, and more specifically pertains to setting for communication in such a communication device.

2. Description of the Related Art

Typical examples of a communication device include a router that connects multiple computers to the Internet and a wireless LAN access point that establishes a wireless LAN. The communication device generally requires specified setting for communication on a first power supply to the communication device. For example, the router that adopts the PPPoE (Point-to-Point Protocol over Ethernet, Ethernet is a registered trademark) protocol for connection to the Internet requires setting of a user ID and a password. The wireless LAN access point usually requires setting of an SSID and a WEP key. Some proposed techniques for setting such information are disclosed, for example, in Japanese Patent Laid-Open Gazette No. 2004-40651 and No. 2003-283589.

The user's setting operations for communication setting in the communication device are generally based on a Web browser installed in a computer. The user enters an IP address, which is allocated in advance to the communication device, in a URL entry box on the Web browser. A specific Web page for entry of setting information required for the communication setting is then sent from the communication device to the computer. The specific Web page is displayed on the Web browser of the computer for the user to enter the required setting information.

In the event of activation of the Web browser before completion of the communication setting, the Web browser displays an error message, for example, 'No Server is Found or there is a DNS error'. Under such conditions, the user may not be sure which action is to be taken next. The error message may successfully inform the user of no completion of the communication setting. The user who is unfamiliar with the communication setting may, however, have difficulties in entering the IP address of the communication device in the URL entry box on the Web browser to complete the communication setting in the communication device. The user should be informed in advance of the IP address allocated to the communication device. Even a skilled user may thus find some difficulties in setting operations to establish communication.

SUMMARY OF THE INVENTION

The object of the invention is thus to eliminate the drawbacks of the prior art technique and to provide a technique of enabling easy setting for communication in a communication device.

In order to attain at least part of the above and the other related objects, one aspect of the present invention is directed to a communication device that utilizes specified communication setting to establish communication with a server via a certain network. The communication device of the invention includes: a judgment module that determines whether the communication setting has been completed; an IP address reply module that, when the judgment module determines no completion of the communication setting, in response to reception of a request for retrieval of an IP address corresponding to an arbitrary server name from a computer, sends back a unique IP address, which is allocated to the communication device; a page return module that receives a page display request, which is sent from the computer to the unique IP address, and returns a specific page for entry of information required for the communication setting; a setting information receiving module that receives the information entered in the specific page from the computer; and a setting module that concludes the communication setting based on the received information and registers a result of the communication setting.

In the case of no completion of the communication setting, the specific page for entry of the information required for the communication setting is displayed, regardless of the user's request for browsing any homepage on the server. This arrangement facilitates the user's setting operations in the communication device. The specific page for entry of the information required for the communication setting is displayed on the computer without the user's entry of an IP address of the communication device. This arrangement further facilitates the user's setting operations in the communication device.

In one preferable embodiment of the invention, the communication device works to relay communication between a primary network and the certain network. In this embodiment, the judgment module determines no completion of the communication setting, when information used for acquisition of the IP address, which is used for communication via the certain network, from the server connecting with the certain network has not been set as the communication setting. For example, the server is a PPPoE server, and the information used for acquisition of the IP address includes a user ID and a password to be sent to the PPPoE server. This enables the user to operate the computer and complete settings required for connection to the certain network, for example, the Internet or a WAN.

The communication device of the invention may be constructed as a wireless LAN access point. In this case, the judgment module may determine no completion of the communication setting, when at least one of an SSID, a WEP key, and a radio channel used for communication via the wireless network has not been set as the communication setting. This ensures setting for the high-security wireless communication or setting for reduction of potential interference or intervention of wireless communication.

In the communication device having any of the above arrangements, the IP address reply module may receive the request as a DNS request and send back the unique IP address as a DNS reply. The unique IP address allocated to the communication device can thus be sent to the computer according to a general communication protocol adopted in an active Web browser on the computer.

The diverse arrangements of the invention described above may be adequately combined or partly omitted according to the requirements. Other applications of the invention include a setting method of the communication device and a computer program used for setting the communication device. Any of the diverse arrangements described above may be adopted in any of these other applications. The computer program may be recorded in a computer readable recording medium. Typical examples of the recording medium include flexible disks, CD-ROMs, DVD-ROMs, magneto-optical disks, memory cards, hard disks, and diversity of other computer readable media.

BRIEF DESCRIPTION OF THE DRAWINGS

FIG. 5 is a flowchart showing a modified initial setting routine executed by the communication device and the client CL; and FIG. 6 is a flowchart showing a WEP key setting routine executed by the communication device and the client CL in a second embodiment of the invention.

DESCRIPTION OF THE PREFERRED EMBODIMENTS

Figure 1:
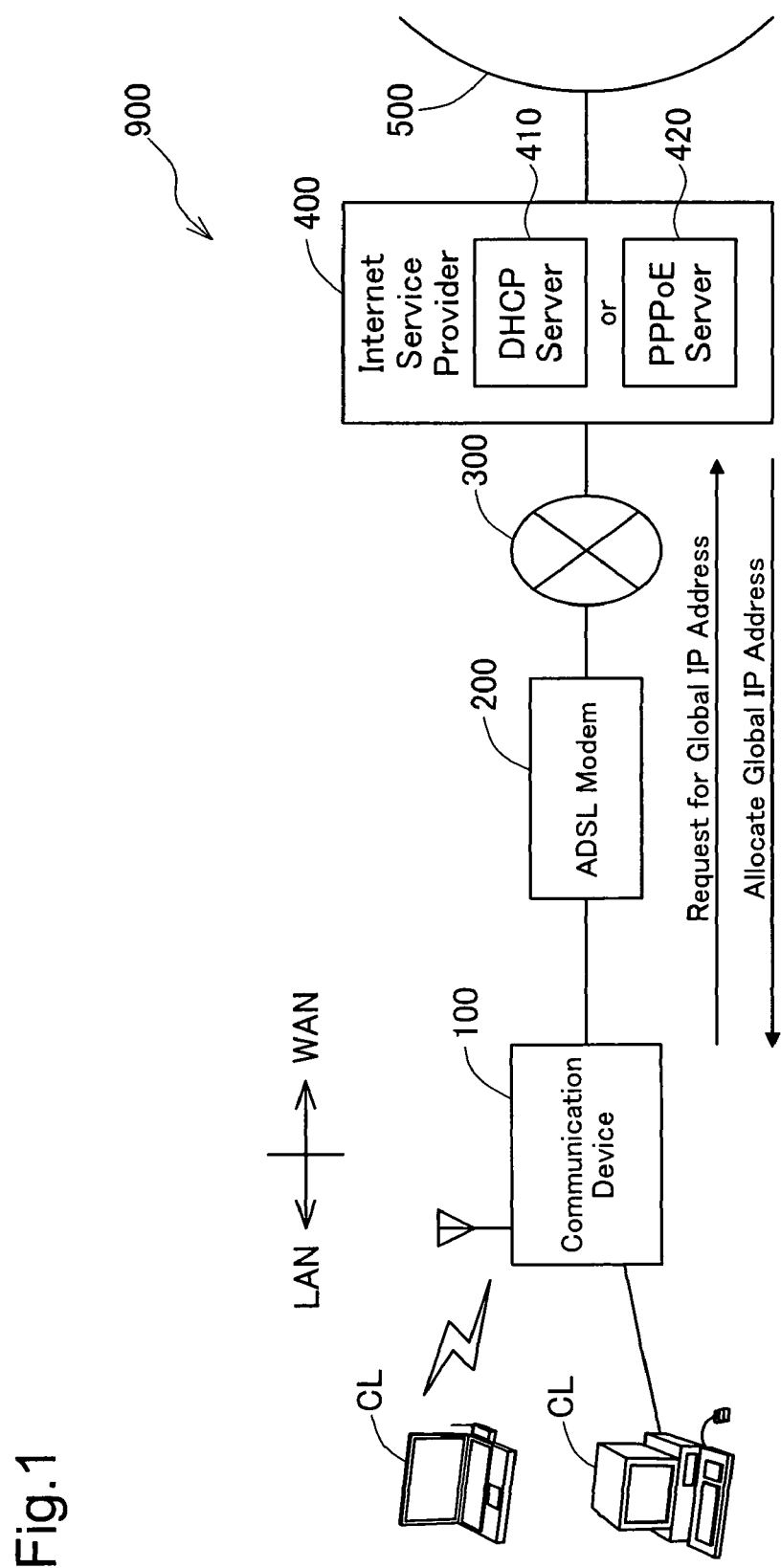
FIG. 1 shows the configuration of an Internet connection system including a communication device in one embodiment of the invention.

Some modes of carrying out the invention are described below as preferred embodiments in the following sequence:

A. First Embodiment (A1) Internet Connection System
(A2) General Structure of Communication Device
(A3) Initial Setting Process
(A4) Modification
B. Second Embodiment
(A1) Internet Connection System FIG. 1 shows a configuration of an Internet connection system 900 including a communication device 100 in one embodiment of the invention. The communication device 100 is constructed as a broadband router having the functions of a wireless LAN (local area network) access point links multiple client computers CL (hereafter referred to as 'clients CL') connecting therein a LAN and to the Internet 500.

An ADSL modem 200 is linked with a WAN (wide area network) port of the communication device 100 and makes connection via a telephone line 300 with each Internet service provider 400 (hereafter referred to as 'ISP 400') that provides Internet connection services. The ADSL modem 200 adopts the ADSL (Asymmetric Digital Subscriber Line) standard to establish bridge connection between an internal network of each ISP 400 and the communication device 100 via the telephone line 300.

The internal network of each ISP 400 has a server that allocates a global IP address to the communication device 100 in response to a request for global IP address from the communication device 100. The server installed in each ISP 400 is one of two different types, a DHCP (Dynamic Host Configuration Protocol) server 410 or a PPPoE (Point-to-Point Protocol over Ethernet) Server 420.

The PPPoE server 420 allocates a global IP address to the communication device 100 after PAP (Password Authentication Protocol) authentication or CHAP (Challenge Handshake Authentication Protocol) authentication based on a user ID and a password. These required pieces of information (the user ID and the are thus to be set in the communication device 100 to make connection with the ISP 400 including the PPPoE server 420. The DHCP server 410 does not perform such authentication. No special settings other than a fundamental setting 'use a DHCP server' are thus required in the communication device 100 to make a connection with the ISP 400 including the DHCP server 410. An initial setting process of this embodiment described later allows omission of even this fundamental setting 'use a DHCP server'.

As shown in FIG. 1, the Internet connection system 900 of this embodiment utilizes the ADSL modem 200 and the telephone line 300 to connect the communication device 100 to the ISP 400. The ADSL modem 200 and the telephone line 300 may be replaced by an optical network unit (ONU) and fiber-optic communication.

(A2) General Structure of Communication Device

Figure 2:
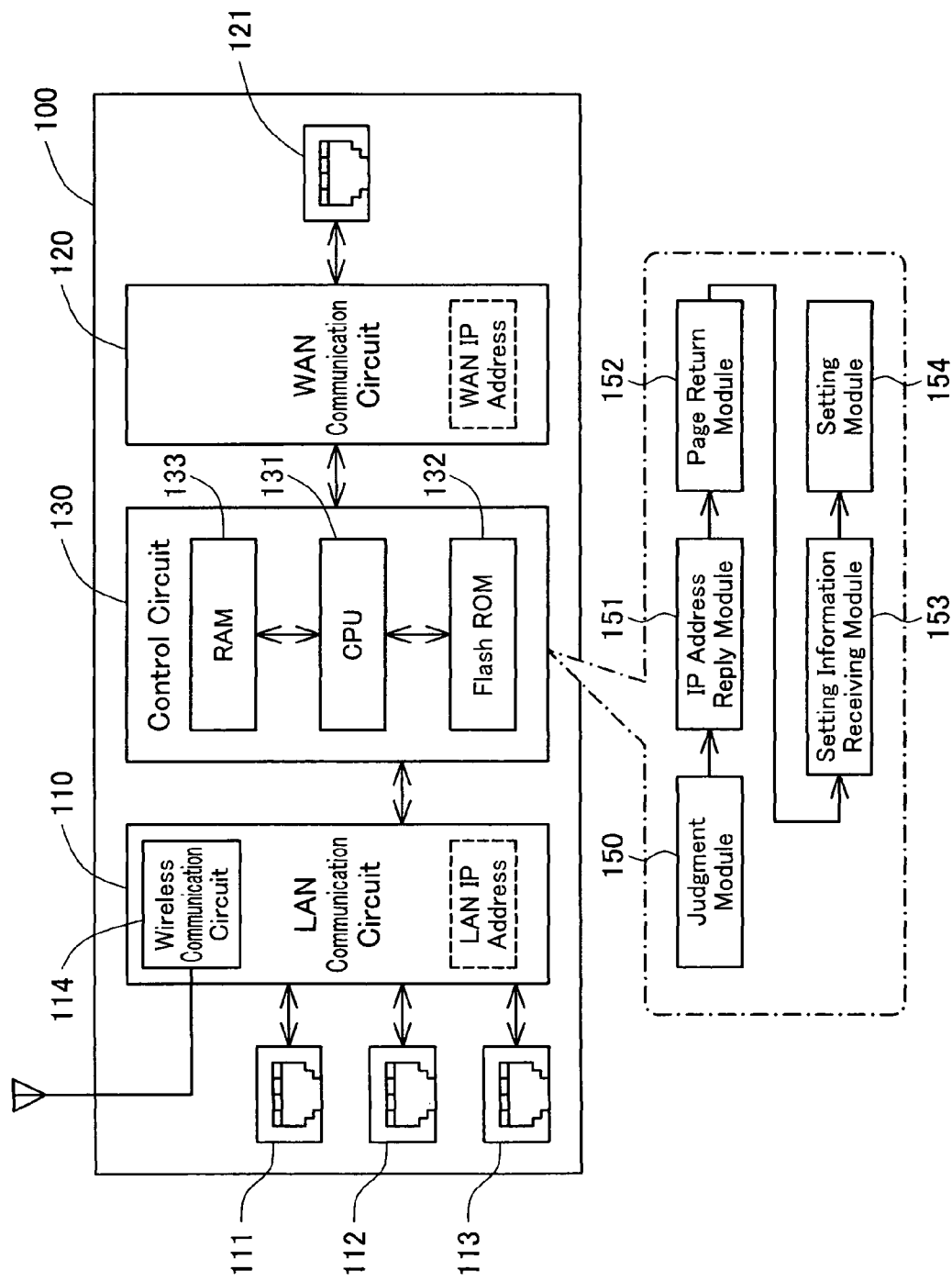
FIG. 2 is a block diagram schematically illustrating the structure of the communication device in the embodiment.

FIG. 2 is a block diagram schematically illustrating the structure of the communication device 100. As illustrated, the communication device 100 includes a LAN communication circuit 110, a WAN communication circuit 120, and a control circuit 130.

The LAN communication circuit 110 includes multiple LAN ports 111 to 113 and a wireless communication circuit 114 and controls communications with clients CL having wired connections to the LAN ports 111 to 113 and with clients CL having wireless connections. The wireless communication circuit 114 makes wireless communication based on a wireless LAN standard IEEE 802.11a/b/g.

The LAN communication circuit 110 has a unique IP address (LAN IP address) allocated in advance to be used in a LAN network. This unique IP address is set in each client CL, for example, as an address of identifying the location of a default gateway or a DNS (Domain Name Server). In the system of this embodiment, the IP address '192. 168. 0.1' is set as the factory default. The IP address may be changed according to the requirements.

The WAN communication circuit 120 has a WAN port 121 to connect with the ADSL modem 200 and controls communications with the internal network of each ISP 400 and with the Internet 500.

The WAN communication circuit 120 has a global IP address allocated in advance as a unique IP address (WAN IP address) to be used in a WAN network. The global IP address is allocated by the DHCP server 410 or the PPPoE server 420 included in the internal network of the ISP 400, in response to a request from the communication device 100. The allocation of the global IP address to the WAN communication circuit 120 enables the communication device 100 to relay communication between the client CL and the Internet 500.

The control circuit 130 controls both the LAN communication circuit 110 and the WAN communication circuit 120. The control circuit 130 has router functions to relay communication between the LAN network and the WAN network and IP masquerade functions to change IP addresses and TCP/UDP port numbers of multiple clients CL and make simultaneous connections of the multiple clients CL to the Internet 500. The control circuit 130 also has DHCP server functions to allocate an IP address to each of multiple clients CL on the LAN in response to a request from the client CL, as well as DNS proxy functions to perform server name resolution in response to a DNS request sent from each client CL.

The control circuit 130 includes a CPU 131, a flash ROM 132, and a RAM 133. The CPU 131 executes a control program stored in the flash ROM 132 to attain the functions mentioned above as the software configuration. The RAM 133 is used as a work area for execution of the control program. The flash ROM 132 also stores various setting parameters of the communication device 100. The settings stored in the flash ROM 132 are readily restored to the factory defaults by an operation of a reset switch (not shown).

The control circuit 130 also has functions to receive the user's communication-related setting operations via a Web browser on the client CL, in addition to the functions mentioned above. These functions are also actualized by the software configuration of a judgment module 150, an IP address reply module 151, a page return module 152, a setting information receiving module 153, and a setting module 154.

The judgment module 150 determines whether the setting required for acquisition of a global IP address from the PPPoE server 420 has been completed. The result of the determination depends upon registration or no registration of the user ID and the password, which are required for authentication by the PPPoE server 420, in the flash ROM 132.

When the judgment module 150 determines no completion of the required setting, in response to reception of a DNS request with an arbitrary server name (domain name) from one of the multiple client CL, the IP address replay module 151 sends back the unique LAN IP address allocated to the communication device 100 as a DNS reply to the client CL, regardless of the contents of the DNS request.

In response to reception of an HTTP request from the client CL, the page return module 152 sends back a Web page including a user ID input box and a password input box to the client CL. The HTTP request gives a page display request to the unique LAN IP address sent back from the communication device 100 to the client CL as the DNS reply. The Web page is described in HTML (HyperText Markup Language) and is recorded in advance in the flash ROM 132.

The setting information receiving module 153 receives the user ID and the password entered by the user in the Web page from the client CL. The user ID and the password received by the setting information receiving module 153 are registered into the flash ROM 132 by the setting module 154. The registration of the user ID and the password in the flash ROM 132 completes the communication setting required for acquisition of the global IP address from the PPPoE server 420.

(A3) Initial Setting Process

The CPU 131 of the communication device 100 executes an initial setting process on a power supply to the communication device 100 having the structure described above. The initial setting process is performed to connect the communication device 100 to the Internet 500 as described below.

Figure 3:
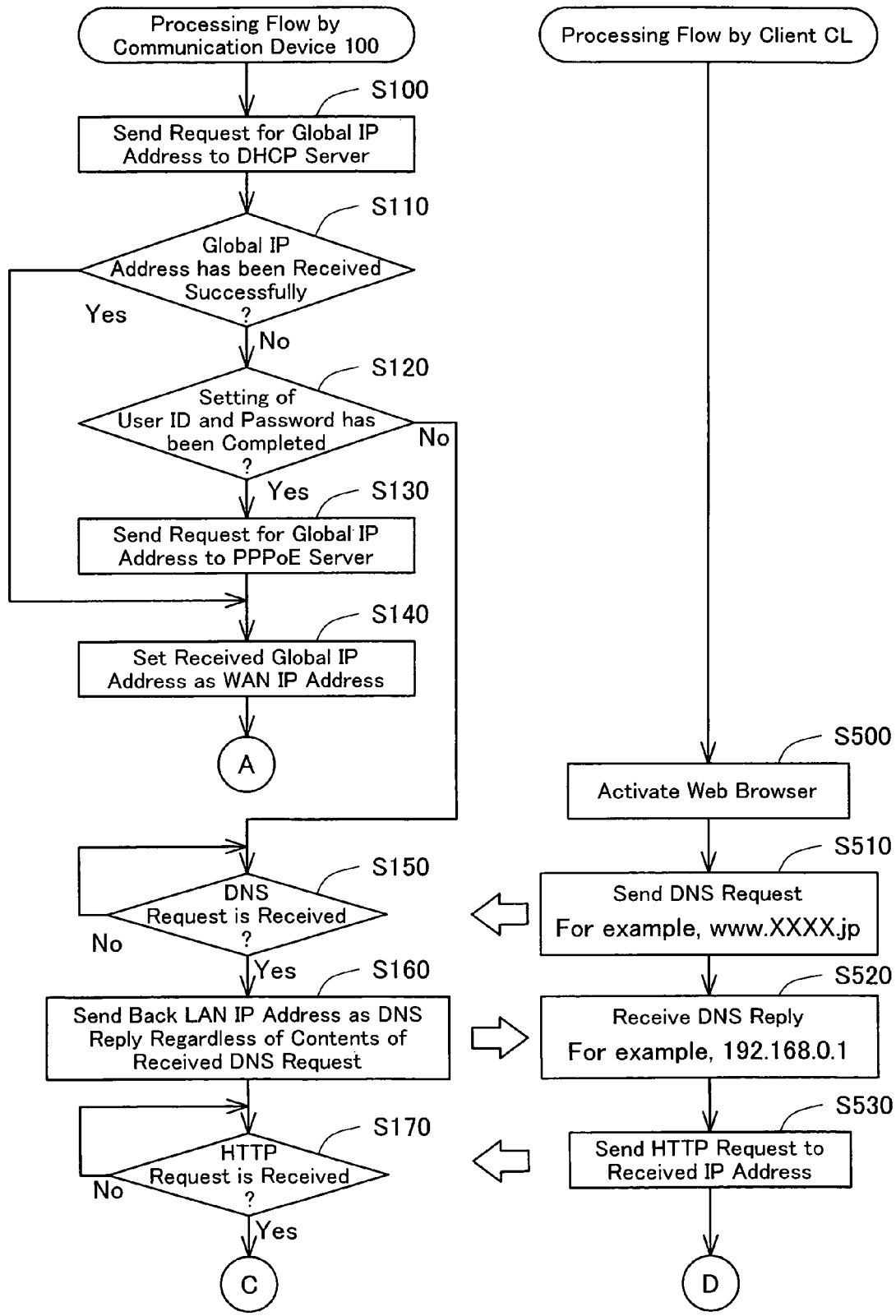
FIG. 3 is a flowchart showing an initial setting routine executed by the communication device and a client CL included in the Internet connection system of FIG. 1.
Figure 4:
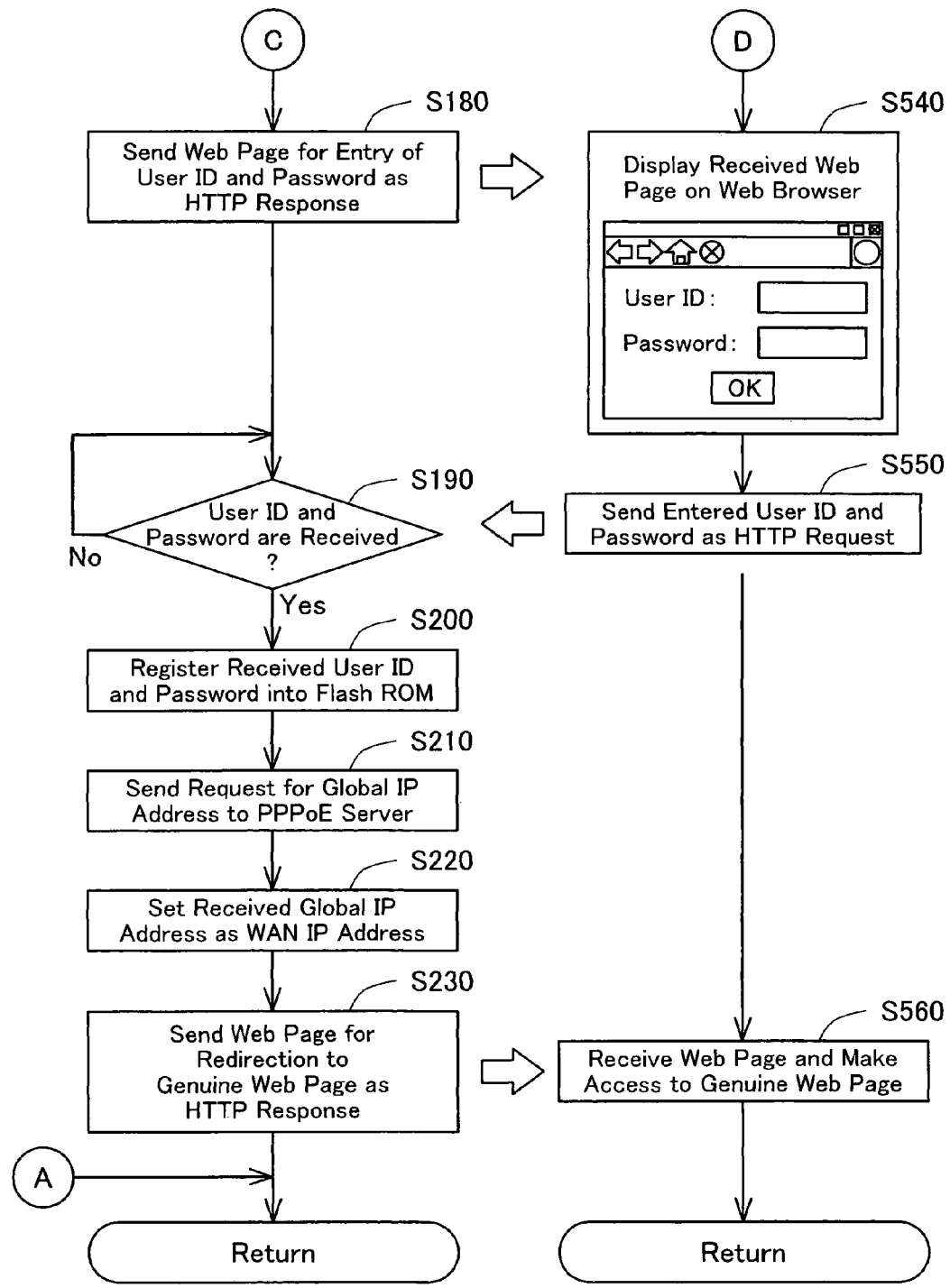
FIG. 4 is a flowchart showing the initial setting routine executed by the communication device and the client CL.

FIGS. 3 and 4 are flowcharts showing an initial setting routine executed in the embodiment. The left flow represents a series of processing executed by the communication device 100 and the right flow represents a series of processing executed by each of the multiple clients CL. The CPU 131 first sends a request for the global IP address to the DHCP server 410 via the WAN communication device 120 (step S100). A DHCP discover message is broadcasted to the WAN as the request for the global IP address. The message includes a unique MAC (Media Access Control) address allocated to the WAN communication circuit 120.

When the global IP address is sent from the DHCP server 410 to the MAC address, the CPU 131 receives the global IP address and specifies successful acquisition of the global IP address (step S110: Yes). The CPU 131 then sets the received global IP address as the WAN IP address (step S140). The CPU 131 terminates the initial setting routine after the setting at step S140, when the DHCP server 410 is installed in the ISP 400. Setting of the WAN IP address enables the communication device 100 to make access to the Internet 500 by the TCP/IP protocol and to relay the communication of the client CL to the Internet 500.

When a predetermined time period (for example, 10 seconds) has elapsed with no reply from the DHCP server 410, on the other hand, the CPU 131 specifies failed acquisition of the global IP address (step S110: No). Such failure is ascribed to the absence of the DHCP server 410 in the ISP 400. The CPU 131 is then required to acquire the global IP address from the PPPoE server 420.

The acquisition of the global IP address from the PPPoE server 420 requires transmission of the user IP and the password to the PPPoE server 420 as mentioned previously. The CPU 131 determines whether the setting of the user ID and the password has been completed (step S120). The result of the determination depends upon registration or no registration of the user ID and the password in the flash ROM 132. In the case of registration of the user ID and the password, the CPU 131 determines completion of the required communication setting (step S120: Yes) and sends a request for the global IP address to the PPPoE server 420 (step S130).

According to the following procedure, the CPU 131 requests the PPPoE server 420 to send the global IP address. The CPU 131 controls the WAN communication circuit 120 to broadcast a PADI packet to the WAN and waits for a reply from the PPPoE server 420. The PADI packet includes the unique MAC address allocated to the WAN communication circuit 120. In response to a reply from the PPPoE server 420 to the MAC address, the CPU 131 receives the reply and sends back the user ID and the password to the PPPoE server 420 for authentication. On successful authentication with the user ID and the password, the PPPoE server 420 sends the global IP address to the communication device 100. The CPU 131 accordingly receives the global IP address from the PPPoE server 420.

After the acquisition of the global IP address from the PPPoE server 420, the CPU 131 sets the received global IP address as the WAN IP address (step S140) and exits from the initial setting routine.

In the case of no registration of the user ID and the password in the flash ROM 132, the CPU 131 determines no completion of the required communication setting (step S120: No) and executes a series of processing discussed below to input the user ID and the password from the client CL.

The CPU 131 determines whether a DNS request has been received from the client CL (step S150). The CPU 131 repeats the determination and waits until reception of the DNS request (step S150: No).

On activation of a Web browser on the client CL (step S500), the client CL sends, as the DNS request, a server name (for example, 'www.XXXX.jp) included in a URL (for example, 'http://www.XXXX/jp/index.html') of a preset homepage address for the Web browser (step S510). The DNS request is used for retrieval of an IP address corresponding to the server name. A URL of a Web browser maker is generally set as the homepage address on the occasion of a first connection of the client CL to the Internet 500.

In response to reception of the DNS request sent from the client CL (step S150: Yes), the CPU 131 of the communication device 100 sends back the unique LAN IP address ('192.168.0.1') allocated to the LAN communication circuit 110 of the communication device 100 as a DNS reply to the client CL, regardless of the contents of the DNS request (step S160).

The LAN IP address '192.168.0.1' is a private IP address and is different from the genuine IP address corresponding to the server name 'www.XXXX.jp'. Upon no completion of the setting of the user ID and the password required for the PPPoE communication, regardless of the contents of the DNS request received from the client CL, the communication device 100 does not send back the genuine IP address required by the DNS request as a valid DNS reply but returns the false IP address '192.168.0.1' as a fake DNS reply.

The Web browser on the client CL receives the fake DNS reply (step S520), specifies the IP address '192.168.0.1' of the fake DNS reply as the IP address corresponding to the server name 'www.XXXX.jp', and sends an HTTP request to the specified address (step S530). The CPU 131 of the communication device 100 waits until reception of the HTTP request from the client CL (step S170).

In response to reception of the HTTP request from the client CL at step S170, the CPU 131 sends a Web page for entry of the user ID and the password as an HTTP response to the client CL (step S180) in the flowchart of FIG. 4. The client CL receives the Web page and displays the received Web page on the Web browser (step S540). The user enters the user ID and the password, which have been notified in advance by the ISP 400, in the Web page displayed on the Web browser of the client CL. The ISP 400 has notified the user of the user ID and the password in advance, for example, by post.

When the user enters the user ID and the password and clicks an 'OK' button provided on the Web page, the Web browser on the client CL sends the entered user ID and password as an HTTP request to the communication device 100 (step S550). The CPU 131 of the communication device 100 specifies reception of the user ID and the password (step S190) and registers the received user ID and password into the flash ROM 132 (step S200). This completes the communication setting required for acquisition of the global IP address from the PPPoE server 420.

The CPU 131 reads the user ID and the password from the flash ROM 132 and sends a request for the global IP address with the user ID and the password to the PPPoE server 420 (step S210). The CPU 131 sets the global IP address acquired as a response to the request as the WAN IP address (step S220). Setting of the WAN IP address enables the communication device 100 to make access to the Internet 500 by the TCP/IP protocol and to relay the communication of the client CL to the Internet 500.

The CPU 131 gives an inquiry for the genuine IP address corresponding to the server name received as the DNS request at step S150 to a DNS server provided on the ISP 400. The CPU 131 sends a Web page for redirection to the genuine IP address as an HTTP response to the HTTP request received at step S170 (step S230). The client CL makes an access to the genuine Web page in response to the instruction of redirection described in the Web page received as the HTTP response (step S560). The genuine Web page specified by the homepage address preset for the Web browser is accordingly displayed on the Web browser of the client CL, after the display of the Web page for the entry of the user ID and the password.

The initial setting process described above is performed when the communication device 100 is powered up. After completion of the initial setting process, the communication device 100 does not send back a fake DNS reply but returns a valid DNS reply to the client CL, in response to a new DNS request received from the client CL. The genuine IP address returned to the client CL as the valid DNS reply is obtained by an inquiry to the DNS server provided on the ISP 400. The Web browser on the client CL can thus display an arbitrary homepage on the Internet 500 via the communication device 100.

As described above, the communication device 100 of the embodiment sends a request for the global IP address to the DHCP server 410, prior to the PPPoE server 420. When the DHCP server 410 is installed in the ISP 400, the client CL can establish a connection to the Internet 500 without setting of the user ID and the password.

When the DHCP server 410 is not installed in the ISP 400, the communication device 100 receives the global IP address from the PPPoE server 420. Only in the case of no registration of the user ID and the password in the flash ROM 132, the communication device 100 sends the Web page for entry of the user ID and the password to the Web browser of the client CL. Once the user ID and the password are set and registered in the flash ROM 132, the user's troublesome setting operations are not required on a next power supply to the communication device 100.

In the case of no completion of setting of the user ID and the password, the Web page for entry of the user ID and the password is displayed on the Web browser of the client CL, regardless of the user's request for browsing any homepage. The display of the Web page facilitates the user's setting operations. The Web page for entry of the user ID and the password is displayed without the user's entry of an IP address allocated to the communication device 100 in a URL input box on the Web browser. This ensures the user's easy setting operations without information of the LAN IP address of the communication device 100, unlike the prior art technique.

In the case of reception of a wrong user ID or a wrong password from the client CL at step S190 in the initial setting routine, the CPU 131 fails to receive the global IP address from the PPPoE server 420 at step S220. In such cases, the communication device 100 may start the initial setting routine again from step S100 or may return the processing flow to step S180. The Web page for entry of the user ID and the password is accordingly displayed again on the Web browser of the client CL.

Successful acquisition of the global IP address at step S110 specifies the installation of the DHCP server 410 in the ISP 400, whereas failed acquisition of the global IP address at step S110 specifies the installation of the PPPoE server 420 in the ISP 400. Namely this identifies the server installed in the ISP 400, either the DHCP server 410 or the PPPoE server 420. Storage of the identification result in the flash ROM 132 enables the communication device 100 to immediately identify the destination of transmission of a request for the global IP address, either the DHCP serve 410 or the PPPoE server 420, on a next power supply to the communication device 100. The processing of steps S100 and S110 may be omitted when the identification result shows the installation of the PPPoE server 420 in the ISP 400. This enables the client CL to make an immediate connection to the Internet 500.

(A4) Modifications

The communication device 100 of the embodiment makes an access to the DHCP server 410, prior to the PPPoE server 420 in the initial setting process. In one possible modification of the initial setting process, the communication device 100 may make an access to the PPPoE server 420, prior to the DHCP server 410.

FIG. 5 is a flowchart showing a modified initial setting routine as a modified example of the embodiment. In the modified initial setting routine of FIG. 5, the CPU 131 first makes an access to the PPPoE server 420 (step S101). When a predetermined time period (for example, 10 seconds) has elapsed with no response from the PPPoE server 420, the CPU 131 specifies a failed access to the PPPoE server 420 (step S102: No). The failed access to the PPPoE server 420 suggests no installation of the PPPoE server 420—in the ISP 400. The CPU 131 accordingly sends a request for the global IP address to the DHCP server 410 (step S103). The CPU 131 receives the global IP address from the DHCP server 410 and sets the received global IP address as the WAN IP address (step S140).

In the case of a successful access to the PPPoE server 420 (step S102: Yes), on the other hand, the CPU 131 executes the processing of and after step S120 in the same manner as the initial setting routine of the embodiment to receive the global IP address from the PPPoE server 420.

The modified initial setting process facilitates the settings of the communication device 100, like the initial setting process of the embodiment. The modified initial setting process to make an access to the PPPoE server 420 prior to the DHCP server 410 is effectively applied when the ADSL modem 200 of FIG. 1 is not the bridge type but a router type having a PPPoE bridge function and a DHCP server function. The ADSL modem of the router type is referred to as the PPPoE modem in the following description.

When the communication device 100 makes an access via the PPPoE modem to the DHCP server 410 prior to the PPPoE server 420 to acquire the global IP address in the case of installation of the PPPoE sever 420 in the ISP 400, the DHCP server function of the PPPoE modem gives an IP address to the communication device 100. Namely a private IP address allocated by the PPPoE modem, instead of the global IP address allocated by the ISP 400, is set as the WAN IP address of the communication device 100. A failed connection of the PPPoE modem to the Internet 500 thus leads to a failed access of the client CL to the Internet 500.

When the communication device 100 makes an access via the PPPoE modem to the PPPoE server 420 prior to the DHCP server 410 to acquire the global IP address in the case of installation of the PPPoE server 420 in the ISP 400 as in the modified initial setting routine of FIG. 5, on the contrary, the PPPoE bridge function of the PPPoE modem enables the communication device 100 to normally acquire the global IP address allocated by the ISP 400. The client CL can thus make a connection to the Internet 500, irrespective of the settings of the PPPoE modem.

In the case of installation of the DHCP server 410 in the ISP 400, the PPPoE modem generally receives allocation of the global IP address from the DHCP server 410. The communication device 100 can thus receive the allocation of the global IP address by the DHCP server function of the PPPoE modem after a failed access to the PPPoE server 420. The initial setting process of this modified example ensures an easy connection of the client CL to the Internet 500 even when the ADSL modem 200 is not the bridge type but the router type having the PPPoE bridge function and the DHCP server function.

B. Second Embodiment

The first embodiment sets the user ID and the password required for authentication by the PPPoE server 420 as the communication setting. The communication setting is, however, not restricted to the user ID or the password. A second embodiment sets a WEP key for wireless communication as the communication setting. The WEP key represents key information used for encryption of radio signals.

FIG. 6 is a flowchart showing a WEP key setting routine executed by the CPU 131 of the communication device 100 in the second embodiment. This WEP key setting routine is triggered by activation of the communication device 100. The left flow represents a series of processing executed by the communication device 100 and the right flow represents a series of processing executed by each of the multiple clients CL.

The CPU 131 first determines whether setting of the WEP key has been completed (step S600). The result of the determination depends upon registration or no registration of the WEP key in the flash ROM 132. In the case of registration of the WEP key, the CPU 131 determines completion of the required communication setting (step S600: Yes) and immediately exits from this WEP key setting routine. In the case of no registration of the WEP key, the CPU 131 determines no completion of the required communication setting (step S600: No) and waits until transmission of a DNS request from the client CL (step S610).

The subsequent processing flow of steps S620 to S670 executed by the CPU 131 in the WEP key setting routine of the second embodiment is essentially identical with the processing flow of steps S160 to S200 and S230 in the initial setting routine of the first embodiment shown in the flowcharts of FIGS. 3 and 4, except replacement of the user ID and the password of the first embodiment with the WEP key as the user's entry. The processing flow of steps S700 to S760 executed by the client CL in the WEP key setting routine of the second embodiment is also essentially identical with the processing flow of steps S500 to S560 in the initial setting routine of the first embodiment shown in the flowcharts of FIGS. 3 and 4, except replacement of the user ID and the password with the WEP key. These processing flows are thus not specifically described here. The communication device 100 receives the WEP key from the Web browser on the client CL and registers the received WEP key into the flash ROM 132. The communication device 100 uses the WEP key set in this WEP key setting process to establish encrypted communication with the client CL.

The arrangement of the second embodiment enables the user to readily set the WEP key and make the high-security encrypted communication. The Web page displayed on the Web browser of the client CL is not restricted to the Web page for the user's entry of the WEP key, but may be a Web page for the user's entry of a new SSID to change the SSID setting for communication from the factory default. In the event of interference or intervention of wireless communication, a Web page for change of a radio channel as the communication setting may be displayed on the Web browser of the client CL.

The embodiments and their modifications discussed above are to be considered in all aspects as illustrative and not restrictive. There may be many other modifications, changes, and alterations without departing from the scope or spirit of the main characteristics of the present invention. For example, the various functions of the software configuration may be actualized by the hardware configuration. In the first embodiment and the second embodiment described above, the Web browser is activated on the client CL to send a DNS request to the communication device 100. An FTP client software program, a GOPHER client software program, or a TELNET client software program may be activated, instead of the Web browser, on the client CL to send a DNS request to the communication device 100. In such modifications, a user interface for entry of a password and a user ID may be provided in a corresponding adequate protocol, instead of the HTTP protocol.

What is claimed is:

1. A communication device that relays communication between a LAN network connecting to a computer and a WAN network connecting to a host, said communication device comprising:
   a rewritable nonvolatile memory;
   a DHCP client module configured to access a DHCP server to acquire a WAN IP address used by the WAN network to connect the communication device to the host;

a judgment module that determines whether a user ID and a password required to acquire from a PPPoE server the WAN IP address are stored in the rewritable nonvolatile memory;

an IP address reply module that, when said judgment module determines that the user ID and password required to acquire from the PPPoE server the WAN IP address are not stored in the rewritable nonvolatile memory and when the DHCP client module fails to acquire the WAN IP address from the DHCP server, in response to reception of a request from the computer for retrieval of a host IP address associated with a host name of the host requested by the computer, sends back a LAN IP address of the communication device instead of the host IP address of the host, thereby effectively faking the IP address of the host;

a page return module that receives from the computer a page display request for displaying a page of the host, addressed to the LAN IP address of the communication device, and returns in response to the page display request an information page for entering at least the user ID and password instead of the page requested by the page display request, thereby sending the computer a page for entry of information instead of the page requested by the computer;

an information receiving module that receives at least the user ID and password entered in the information page returned to the computer; and a setting module that sets a communication setting based on the received user ID and password in the information page received from the computer and registers the received information by storing at least the user ID and password into the rewritable nonvolatile memory;

the communication device implementing a sequence of actions to assist an end user to establish an authentication communication setting required to access an Internet Service Provider (ISP) regardless of whether the ISP uses a DHCP authentication protocol or a PPPoE authentication protocol;

wherein said communication device is further operable to:
send a web page to effectively direct the computer to the page originally requested by the page display request after setting the communication setting.

2. The communication device of claim 1, wherein the PPPoE server is connected to the WAN network.

3. The communication device of claim 1, wherein the DHCP server is connected to the WAN network.

4. A communication device that relays communication between a LAN wireless network connecting to a computer and a WAN network connecting to a host, said communication device comprising:

a rewritable nonvolatile memory;

a judgment module that determines whether at least one of an SSID, a WEP key, and a radio channel of the LAN wireless network is stored in the rewritable nonvolatile memory;

an IP address reply module that, when said judgment module determines that the at least one of an SSID, a WEP key, and a radio channel of the LAN wireless network is not stored in the rewritable nonvolatile memory, in response to reception of a request from the computer for retrieval of a host IP address associated with a host name of the host requested by the computer, sends back a LAN IP address of the communication device instead of the host IP address of the host, thereby effectively faking the IP address of the host;

a page return module that receives from the computer a page display request for displaying a page of the host, addressed to the LAN IP address of the communication device and returns in response to the page display request an information page for entering the at least one of SSID, WEP key, and radio channel of the LAN wireless network determined by the judgement module not to be stored in the rewritable nonvolatile memory instead of the page requested by the page display request, thereby sending the computer a page for entry of information needed to establish the communication instead of the page requested by the computer;

an information receiving module that receives the at least one of SSID, WEP key, and radio channel entered in the information page returned to the computer;

a setting module that sets a communication setting to stabilize the connection to the WAN Network, at least partially based on the at least one of SSID, WEP key, and radio channel in the information page received from the computer and registers at least the received information by storing it into the rewritable nonvolatile memory; and wherein the communication device serves as a wireless LAN access point communicating with multiple client computers using wireless connections;

the communication device implementing a sequence of actions to assist an end user to establish an authentication communication setting required to access an Internet Service Provider (ISP) regardless of whether the ISP uses any one of a plurality of different authentication protocols, including at least one authentication protocol requiring a user to input authentication information;

wherein said communication device is further operable to:
send a web page to effectively direct the computer to the page originally requested by the page display request after setting the communication setting.

5. In a communication device, a method of relaying communication between a LAN network associated with a computer and a WAN network associated with a host, said method comprising:

(a) determining whether a user ID and password required for acquiring a WAN IP address from a PPPoE server is stored in a rewritable nonvolatile memory of the device, wherein the WAN IP address is used by the WAN network and is required to connect the device to the host via the WAN network;

(b) accessing a DHCP server to acquire the WAN IP address;

(c) determining that a communication setting required to establish the communication has not been set when it is determined in (a) that the user ID and password are not stored in the nonvolatile rewritable memory of the device and when failing in (b) to acquire the WAN IP address from the DHCP server;

(d) when it is determined in (c) that the communication setting required to establish the communication has not been set, in response to reception of a request from the computer for retrieval of a host IP address corresponding to a host name of the host requested by the computer, sending back a LAN IP address of the device instead of the WAN IP address corresponding to the host;

(e) receiving from the computer a page display request, for displaying a page of the host, addressed to the LAN IP address of the device;

(f) returning, in response to the page display request, a page for entry of the user ID and password instead of the page requested by the page display request, thereby sending the computer a page for entry of information required to establish the communication instead of the page requested by the computer;

(g) receiving the user ID and password entered in the page returned to the computer;

(h) setting the communication setting at least partially based on the user ID and password entered in the page received from the computer; and (i) registering the communication setting that has been set by storing at least the user ID and password into the rewritable nonvolatile memory; and wherein the communication device serves as a wireless LAN access point communicating with multiple client computers using wireless connections;

wherein a sequence of actions is implemented to assist an end user to establish an authentication communication setting required to access an Internet Service Provider (ISP) regardless of whether the ISP uses a DHCP authentication protocol or a PPPoE authentication protocol;

the method further comprising:

sending a web page to effectively direct the computer to the page originally requested by the page display request after setting the communication setting.

6. The method of claim 5, further comprising:

sending a web page to effectively direct the computer to the page requested by the page display request after setting the communication setting.

7. A communication device operable to relay communication between a LAN network associated with a computer and a WAN network associated with a host, wherein said communication device is further operable to:

receive a request for a host IP address of the host identified by a host name;

(a) determine whether information required for acquiring a WAN IP address from a PPPoE server is stored in a nonvolatile memory of the device, wherein the WAN IP address is used by the WAN network and required for connecting to the host via the WAN network, and wherein the information includes a user ID and a password;

(b) determine that a communication setting needed to establish communication to the host has not been set when it is determined (a) that the information required for acquiring the WAN IP address is not stored in the nonvolatile memory of the device;

send a LAN IP address of the device instead of the WAN IP address of the host name in response to the request when the determining (b) determines that the communication setting needed to establish communication to the host has not been set;

receive a page request for a requested page of the host after sending the LAN IP address of the device;

send an information page for entering the information needed to establish communication with the host instead of the requested page of the host;

receive the information page with the information needed to establish communication with the host;

set the communication setting using the information in the information page in order to establish the communication to the host;

send the requested page of the host after the setting of the communication setting;

send a web page to effectively direct the computer to the page originally requested by the page display request after setting the communication setting; and wherein the communication device serves as a wireless LAN access point communicating with multiple client computers using wireless connections;

the communication device implementing a sequence of actions to assist an end user to establish an authentication communication setting required to access an Internet Service Provider (ISP) regardless of whether the ISP uses PPPoE authentication protocol requiring a user ID and a password and after setting the communication setting direct the user to the page originally requested.

8. A communication device that relays communication between a LAN wireless network connecting to a computer and a WAN network connecting to a host, said communication device comprising:

a rewritable nonvolatile memory;

a judgment module that determines whether at least one of an SSID, a WEP key, and a radio channel of the LAN wireless network is stored in the rewritable nonvolatile memory;

an IP address reply module that, when said judgment module determines that the at least one of an SSID, a WEP key, and a radio channel of the LAN wireless network is not stored in the rewritable nonvolatile memory, in response to reception of a request from the computer for retrieval of a host IP address associated with a host name of the host requested by the computer, sends back a LAN IP address of the communication device instead of the host IP address of the host, thereby effectively faking the IP address of the host;

a page return module that receives from the computer a page display request for displaying a page of the host, addressed to the LAN IP address of the communication device and returns in response to the page display request an information page for entering the at least one of SSID, WEP key, and radio channel of the LAN wireless network determined by the judgment module not to be stored in the rewritable nonvolatile memory instead of the page requested by the page display request, thereby sending the computer a page for entry of information needed to establish the communication instead of the page requested by the computer;

an information receiving module that receives the at least one of SSID, WEP key, and radio channel entered in the information page returned to the computer;

a setting module that sets a communication setting to stabilize the connection to the WAN Network, at least partially based on the at least one of SSID, WEP key, and radio channel in the information page received from the computer and registers at least the received information by storing it into the rewritable nonvolatile memory;

wherein the LAN IP address is a private IP address returned as a fake DNS reply for an initial registration setting procedure to direct the computer to the page for entry of the user ID and password and a valid DNS reply is returned after the registration setting procedure is complete; and wherein the communication device serves as a wireless LAN access point communicating with multiple client computers using wireless connections;

the communication device implementing a sequence of actions to assist an end user to establish an authentication communication setting required to access an Internet Service Provider (ISP) regardless of whether the ISP uses any one of a plurality of different authentication protocols, including at least one authentication protocol requiring authentication information including at least one of SSID, WEP key, and radio channel;

wherein said communication device is further operable to:
send a web page to effectively direct the computer to the page requested by the page display request after setting the communication setting.

9. The device of claim 8, further comprising:
a wired LAN communication circuit configured to provide a connection to the LAN network by a wired network;
a wireless LAN communication circuit configured to provide a connection to the LAN network by a wireless network;
wherein the wired LAN communication circuit and the wireless LAN communication circuit use the LAN IP address in common to communicate with the computer; and
wherein the IP address reply module sends back the LAN IP address of the communication device to the computer when the IP address reply module receives the request for retrieval of the host IP address from the computer, irrespective of whether it is received through the wired LAN communication circuit or the wireless LAN communication circuit.

10. In a communication device, a method of relaying communication between a LAN network associated with a computer and a WAN network associated with a host, said method comprising:
(a) determining whether a user ID and password required for acquiring a WAN IP address from a PPPoE server is stored in a rewritable nonvolatile memory of the device, wherein the WAN IP address is used by the WAN network and is required to connect the device to the host via the WAN network;
(b) accessing a DHCP server to acquire the WAN IP address;
(c) determining that a communication setting required to establish the communication has not been set when it is determined in (a) that the user ID and password are not stored in the nonvolatile rewritable memory of the device and when failing in (b) to acquire the WAN IP address from the DHCP server;
(d) when it is determined in (c) that the communication setting required to establish the communication has not been set, in response to reception of a request from the computer for retrieval of a host IP address corresponding to a host name of the host requested by the computer, sending back a LAN IP address of the device instead of the WAN IP address corresponding to the host;
(e) receiving from the computer a page display request, for displaying a page of the host, addressed to the LAN IP address of the device;
(f) returning, in response to the page display request, a page for entry of the user ID and password instead of the page requested by the page display request, thereby sending the computer a page for entry of information required to establish the communication instead of the page requested by the computer;
(g) receiving the user ID and password entered in the page returned to the computer;
(h) setting the communication setting at least partially based on the user ID and password entered in the page received from the computer;
(i) registering the communication setting that has been set by storing at least the user ID and password into the rewritable nonvolatile memory;
(j) sending a web page to effectively direct the computer to the page originally requested by the page display request after setting the communication setting;
wherein the LAN IP address is a private IP address returned as a fake DNS reply for an initial registration setting procedure to direct the computer to the page for entry of the user ID and password and a valid DNS reply is returned after the registration setting procedure is complete; and
wherein the communication device serves as a wireless LAN access point communicating with multiple client computers using wireless connections;
the communication device implementing a sequence of actions to assist an end user to establish an authentication communication setting required to access an Internet Service Provider (ISP) regardless of whether the ISP uses any one of a plurality of different authentication protocols, including at least one authentication protocol requiring authentication information that includes a user ID and a password and after setting the communication setting direct the user to the page originally requested.

* * * * *